US010628862B2

(12) United States Patent
Allen et al.

(10) Patent No.: US 10,628,862 B2
(45) Date of Patent: Apr. 21, 2020

(54) FRESH PERISHABLE STORE ITEM NOTIFICATION SYSTEMS AND METHODS

(71) Applicant: Walmart Apollo, LLC, Bentonville, AR (US)

(72) Inventors: William Ross Allen, Pea Ridge, AR (US); Jacob Tucker, Bella Vista, AR (US); Richard M. Blair, II, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 369 days.

(21) Appl. No.: 15/444,680

(22) Filed: Feb. 28, 2017

(65) Prior Publication Data
US 2017/0262910 A1    Sep. 14, 2017

Related U.S. Application Data

(60) Provisional application No. 62/305,085, filed on Mar. 8, 2016.

(51) Int. Cl.
*G06Q 30/00* (2012.01)
*G06Q 30/06* (2012.01)
*G06Q 30/02* (2012.01)
*G06Q 10/08* (2012.01)
*G06K 7/14* (2006.01)

(52) U.S. Cl.
CPC ....... *G06Q 30/0601* (2013.01); *G06K 7/1413* (2013.01); *G06Q 10/087* (2013.01); *G06Q 30/0261* (2013.01)

(58) Field of Classification Search
None
See application file for complete search history.

(56) References Cited

U.S. PATENT DOCUMENTS

| 6,102,162 A * | 8/2000 | Teicher | G07F 17/0042 |
| | | | 186/39 |
| 7,347,361 B2 | 3/2008 | Lovett | |
| 7,543,741 B2 | 6/2009 | Lovett | |
| 7,810,720 B2 | 10/2010 | Lovett | |
| 8,390,456 B2 | 3/2013 | Puleston et al. | |
| 2005/0261991 A1* | 11/2005 | Kennamer | G06Q 10/08 |
| | | | 705/28 |

(Continued)

FOREIGN PATENT DOCUMENTS

JP    2013152588 A    8/2013

OTHER PUBLICATIONS

Swedberg, Claire "French Supermarket Tests NFC Tool for Visually Disabled Shoppers," RFIDJournal.com, Sep. 21, 2011, 2 pages.

(Continued)

*Primary Examiner* — Alvin L Brown
(74) *Attorney, Agent, or Firm* — Schmeiser, Olsen & Watts LLP; Timothy P. Collins (57) ABSTRACT

A system and method for providing shoppers with product freshness notifications, comprise a beacon that determines that a fresh perishable item of interest has been added to a store shelf; an updater that updates the system with information about the fresh perishable item added to the store shelf; and a notification generator that sends a notification to a mobile electronic device of the shopper regarding the addition of the fresh perishable item to the store shelf.

20 Claims, 5 Drawing Sheets

(56) References Cited

U.S. PATENT DOCUMENTS

| | | | |
|---|---|---|---|
| 2010/0138497 A1* | 6/2010 | Havas | G06Q 30/02 |
| | | | 709/206 |
| 2012/0101876 A1 | 4/2012 | Turvey et al. | |
| 2014/0095285 A1 | 4/2014 | Wadell et al. | |
| 2014/0316875 A1 | 10/2014 | Tkachenko et al. | |
| 2015/0066802 A1 | 3/2015 | Goulart et al. | |
| 2016/0162715 A1* | 6/2016 | Luk | F25D 29/005 |
| | | | 235/385 |
| 2016/0187757 A1* | 6/2016 | Dagdelen Uysal | G02F 1/167 |
| | | | 359/296 |
| 2016/0371766 A1* | 12/2016 | Schmidt | G06Q 30/0639 |
| 2017/0230533 A1* | 8/2017 | Holub | H04N 19/124 |
| 2018/0068379 A1* | 3/2018 | Bynum | G01C 21/3484 |

OTHER PUBLICATIONS

Averbuch, Rod "'End Grocery Waste' App Based on GS1 DataBar Standard," EndGroceryWaste.com, Jun. 9, 2013; 2 pages.

"Out of Stock Notification by Amasty," MagnetoCommerce.com, first accessed on Jan. 23, 2016; 5 pages.

Esin, Hakan "Five Internet of Things applications for the retail industry," Innova.com, Oct. 16, 2015; 2 pages.

* cited by examiner

FRESH PERISHABLE STORE ITEM NOTIFICATION SYSTEMS AND METHODS

RELATED APPLICATIONS

This application claims priority to U.S. Provisional Patent Application No. 62/305,085, filed Mar. 8, 2016 and entitled "Fresh Perishable Store Item Notification Systems and Methods," the entirety of which is incorporated by reference herein.

FIELD

The present inventive concepts relate generally to inventory management, and more specifically, to the monitoring and notification of fresh perishable store items.

BACKGROUND

Store customers, either present at the store or at a different location than the store, desire to purchase the freshest perishable items or products, such as fruits, vegetables, breads, meats, and so on.

BRIEF SUMMARY

In accordance with an aspect, provided is a system for providing shoppers with product freshness notifications, comprising: a beacon that determines that a fresh perishable product of interest has been added to a store shelf; a product status updater that updates the system with information about the fresh perishable product added to the store shelf; and a notification generator that outputs a notification to a mobile electronic device of the shopper regarding the addition of the fresh perishable product to the store shelf.

In some embodiments, the system further comprises a location detector that detects the shopper inside the store by communication with a geo-fencing, global positioning (GPS), or Wifi system.

In some embodiments, the notification generator outputs the notification in response to the location detector detecting the shopper inside the store.

In some embodiments, the product status updater updates a database with the information about the added fresh perishable items by using an inventory tracking device to scan a product barcode corresponding to the fresh perishable items added to the shelf to update a status of the item in the system.

In some embodiments, the beacon automatically detects the stocking of the store shelf with the fresh perishable items.

In some embodiments, the system determines that the fresh perishable item is added to the store shelf in response to the location detector determining that the shopper is remote from the store.

In some embodiments, when the shopper is at the store, the system determines that the customer is at the store and a determination is made that the fresh perishable item is added to the store shelf.

In another aspect, provided is a method for providing shoppers with product freshness notifications, comprising: determining, by a beacon, that a fresh perishable product of interest has been added to a store shelf; updating a freshness tracking system with information about the added fresh perishable product added to the store shelf; and sending a notification from the freshness tracking system to a mobile electronic device of the shopper regarding the addition of the fresh perishable product to the store shelf.

In some embodiments, the notifications are sent in response to a customer location detected using geo-fencing, global positioning (GPS), or Wifi when the shopper is inside the store.

In some embodiments, the freshness tracking system is updated with the information about the added fresh perishable items by using an inventory tracking device to scan a product barcode corresponding to the fresh perishable items added to the shelf to update a status of the item in the system.

In some embodiments, the beacon automatically detects the stocking of the store shelf with the fresh perishable items.

In some embodiments, when the shopper is determined to be remote from the store, a determination is made that the fresh perishable item is added to the store shelf, and when the shopper is determined to be at the store, a determination is made that the customer is at the store and a determination is made that the fresh perishable item is added to the store shelf.

In some embodiments, the beacon provides data that a store associate is at the store shelf where the fresh perishable item is supposed to be located, and that a determination is made that the store associate is stocking the shelf with the fresh perishable item.

In some embodiments, the method further comprises processing a threshold that establishes whether the store shelf is restocked with the fresh perishable item based on an amount of time of a store associate at the store shelf compared to the threshold.

In some embodiments, the beacon identifies the fresh perishable item.

In some embodiments, the method further comprises opting in, by a shopper, and identifying whether the shopper is at a store or remote from the store; and requesting by the shopper to receive an item freshness status notification of the notification regarding the fresh perishable item.

In another aspect, provided is a computer program product for online appointment scheduling, the computer program product comprising: a computer readable storage medium having computer readable program code embodied therewith, the computer readable program code comprising: computer readable program code configured to determine that a fresh perishable item of interest has been added to a store shelf; computer readable program code configured to update a freshness tracking system with information about the fresh perishable item added to the store shelf; and computer readable program code configured to send a notification from the freshness tracking system to a mobile electronic device of the shopper regarding the addition of the fresh perishable item to the store shelf.

BRIEF DESCRIPTION OF THE SEVERAL VIEWS OF THE DRAWINGS

The above and further advantages may be better understood by referring to the following description in conjunction with the accompanying drawings, in which like numerals indicate like structural elements and features in various figures. The drawings are not necessarily to scale, emphasis instead being placed upon illustrating the principles of the concepts.

DETAILED DESCRIPTION

Customers are generally not aware when fresh perishable items such as fruits, vegetables, breads, meats, salad bars, rotisserie chicken, and so on are added to a store shelf. Today, customer must rely on the physical view of the items or look for times noted on the packaging. On the other hand, retail establishments incorporate inventory management techniques to quickly sell perishable merchandise due to limited shelf life, spoilage, and related well-known problems with perishable items.

Embodiments of the present inventive concepts may be part of the inventory management or interface in real-time with an inventory management system for identifying fresh perishable goods of interest to ensure that they can receive the highest possible product quality. Store customers can use a mobile electronic device, or more specifically, an application stored at and executed on the mobile electronic device to select which type of product freshness notifications they would like to receive. For example, a customer may specify a preference that he/she only wants notifications when the customer is physically present in the store. Another preference may desire for the customer to receive notifications anytime, regardless of the location of the customer. In the first example, if the customer only wishes to be notified in the store, the mobile application can leverage geo-fencing, wifi, or other virtual barrier or location detection technology to determine if the customer is in the store before a notification is sent to the customer. The notification is generated in response to a determination that a store associate has added the fresh perishable goods of interest to a shelf or other store display for customers to purchase. To achieve this, the system leverages precise beacons or other sensors about product locations, i.e., the shelf or display where the fresh goods are stocked.

Thus, in brief overview, customers may execute a software application at a personal computing device such as a smartphone or the like to select which type of product freshness notifications they would like to receive. For example, customer may specify that they only want to receive electronic notifications when they are in the store or any time. If they only want to be notified in the store, the mobile application leverages geo-fencing technology to determine if they are in the store or not. The mobile application outputs that location information to the system to use when sending out notifications. A store employee such as an associate may add fresh perishable goods, such as rotisserie chicken, to store shelves for customers to purchase. The associate may use an inventory tracking device to scan the product barcode in order to update the current status of the product for that store in the system. The system will then find customers that are tracking that fresh product and will send notifications out for the mobile application to receive. Once a customer is notified of the fresh product being available, the customer can now purchase the freshest product possible if they so choose.

Figure 1:
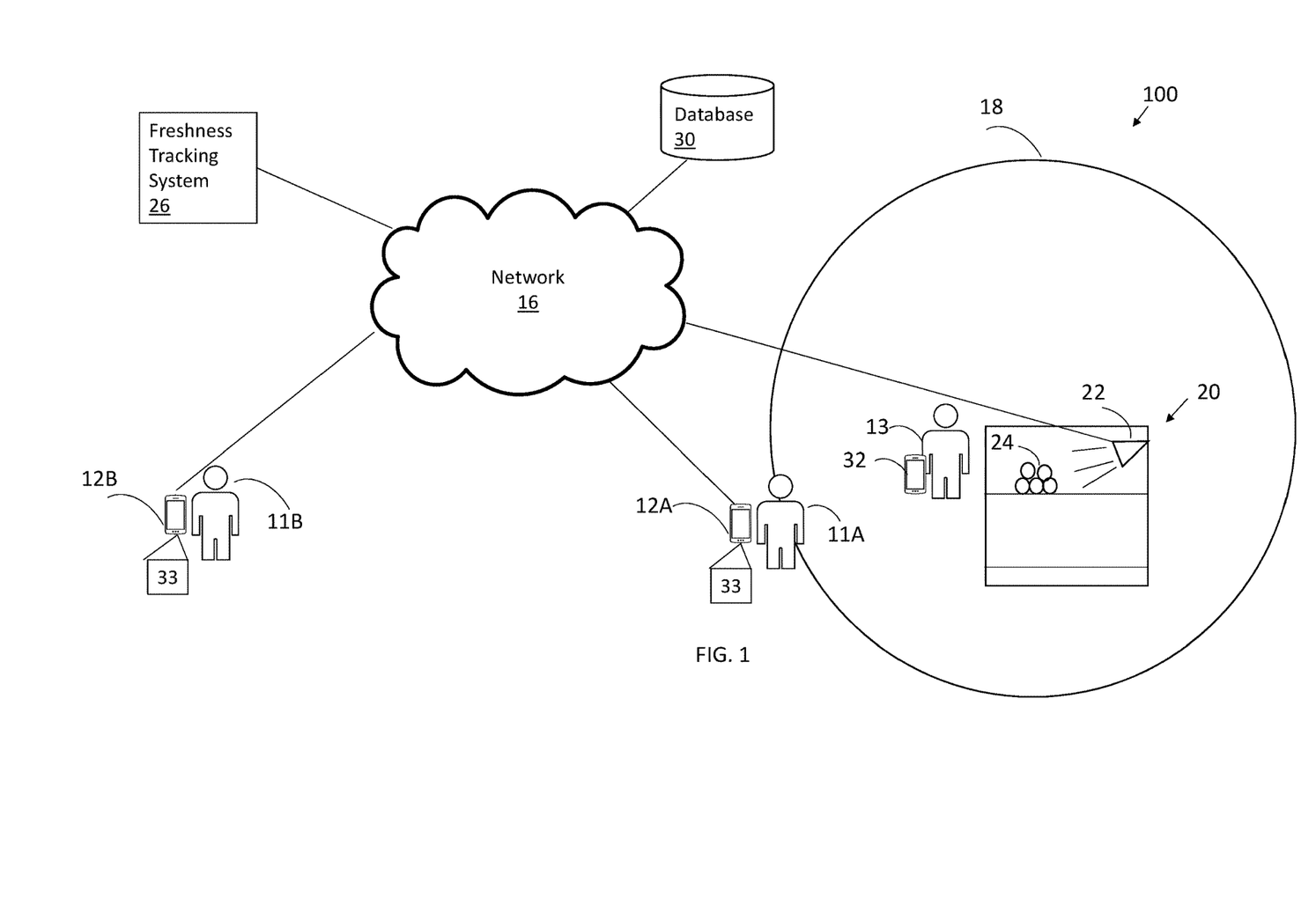
FIG. 1 is a schematic representation of an environment in which embodiments of the present inventive concepts can be practiced.

FIG. 1 is a schematic representation of an environment 100 in which embodiments of the present inventive concepts can be practiced.

The environment 100 includes a retail establishment such as a grocery store at which a plurality of shelves 20 or related storage locations are provided for stocking or restocking with perishable items such as fruits, vegetables, breads, meats, salad bars, rotisserie chicken, and so on. In some embodiments, a first customer 11A present at the store may be interested in purchasing one or more fresh perishable items 24. In other embodiments, a second customer 11B at a different location than the store may be interested in purchasing perishable items 24. The second customer 11B may access a website or the like for purchasing the perishable items 24 from the store shelf 20 even though the second customer 11B is not physically present at the store.

One or more sensors 22 may be positioned at or near the store shelf 20 for detecting when a store associate 13 stocks the shelf 20 with fresh goods. In some embodiments, the sensors 22 include beacons or related transmitters or transponders. In some embodiments, the beacons or the like include object recognition technology for identifying the item or items being placed on the shelf 20. The movement of fresh perishable items 24 to the store shelf 20 can be detected by the sensors 22 which may include an antenna that forms a field at which the fresh items 24 may be detected. The sensors 22 may include beacons that are preferably low power, efficient devices. They can emit a signal that can be received by a handheld electronic device 32 used by a store associate 13, for example, a Motorola™ MC40 mobile computer or the like that an application running on the device 32 can make a determination as to whether the associate 13 is stocking a shelf 20 or not, and to also determine what product is being restocked at the shelf 20. The environment 100 permits a determination to be made with minimal effort from the associate 13. For example, the associate 13 may select a prompt on a display at the device 32 to confirm which product is being updated if the system 26 does not provide such a determination.

The freshness tracking system 26 communicates with the sensors 22 to receive data regarding the stocking of the fresh goods, for example, when, where, and so on. For example, the sensors 22 permit the system 26 to recognize when a store associate 13 is restocking the shelf 20 with fresh perishable items 24 based on time and space thresholds. For example, the store associate 13 can be determined to perform a restocking event when the store associate 13 is at the store shelf 2 for a predetermined amount of time. In another example, the sensor beacons 22 may emit a signal for a certain predetermined range that forms a virtual boundary or perimeter about the product, and the system 26 uses the boundary or perimeter to determine the identity of the product based on the received signal. The freshness tracking system 26 can use location data from a signal generated that includes a time of crossing of the customer 11A at the geofence boundary 18. This data as well as the product stocking data can be used to generate a notification to the customer 12A that the fresh perishable items 24 have recently been placed on the shelf 20.

The freshness tracking system 26 may include a database 30 that stores data related to the monitoring and notification of the fresh perishable store items 24. This may include a list of customers interested in the fresh perishable store items 24, which can be used to identify those customers to receive notifications when the shelf 20 is stocked or restocked with the fresh perishable items 24. The database 30 may be part of the same hardware platform as the freshness tracking system 26, or separate from the system 26 and in communication with the system 26 via the network 16.

Figure 2:
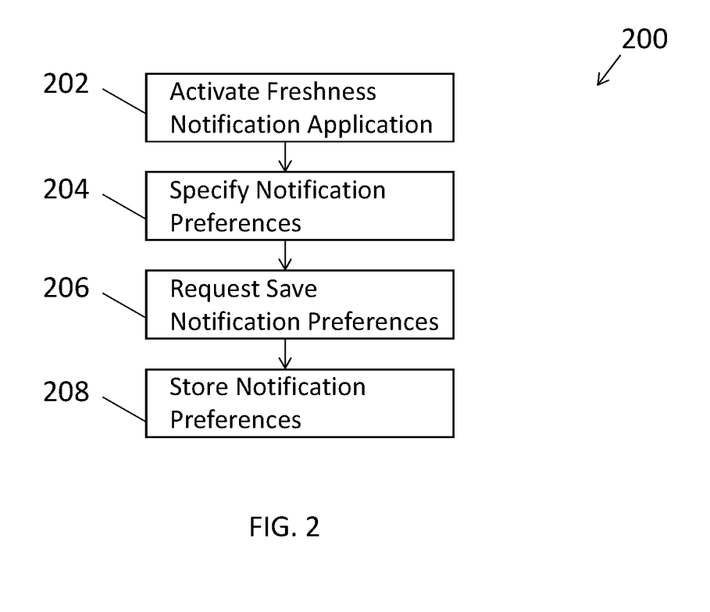
FIG. 2 is a flowchart of a method for notification of the availability of a fresh perishable store item, in accordance with some embodiments.

FIG. 2 is a flowchart of a method 200 for notification of the availability of a fresh perishable store item, in accordance with some embodiments. In describing the method 200, reference is made to FIG. Some or all of the method 200 can be performed at one or more hardware components of the environment 100 of FIG. 1, such as but not limited to the sensor device 22 such as a beacon, mobile device 12, and/or freshness tracking system 26.

At block 202, a freshness notification application is activated at mobile electronic device.

At block 204, notification preferences are specified. Examples may include but not be limited to preferences based on location, i.e., whether the customer 11 is in the store, based on product, i.e., what products to notify on, specific stores to notify for. Another example is a notification time. For example, if bananas are stocked at 2:00 AM, a preference may establish a rule not to generate a notification until notify the customer 11 until 8 AM. Other example preferences may include queue up notifications while not in a particular notification time range, or don't queue and just miss notifications outside the time range.

At block 206, the freshness application generates a request to save the notification preferences. The request is output to the freshness tracking system 26. The data is analyzed under the rule in block 204 to determine the request result.

At block 208, the system 26 stores the notification preferences, or directs the notification preferences for storage at the database 30.

Figure 3:
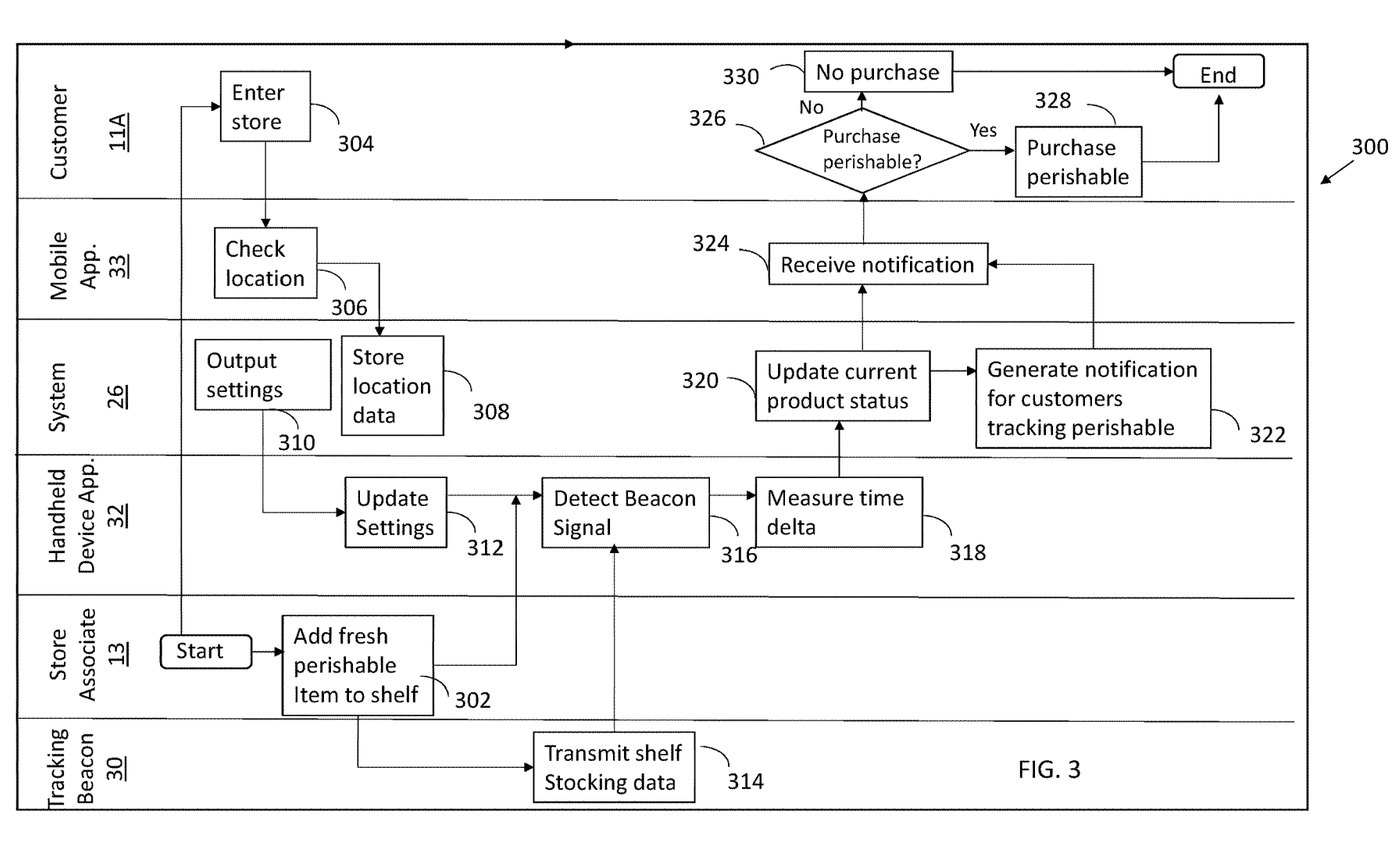
FIG. 3 is a process flow for store item notification, in accordance with some embodiments.

FIG. 3 is a process flow 300 for store item notification, in accordance with some embodiments. When describing the process flow 300, reference is made to various elements of the environment described with reference to FIG. 1.

At block 302, a customer associate 13 can add fresh perishables 24 to a store shelf 20. The customer associate 13 may include a scanning device or other mobile device for identifying the fresh perishable 24 added to the store shelf 20, which can produce a special purpose timestamp and/or other product information, which is processed by the freshness tracking system 26.

At block 304, a customer 11A may enter a geofenced location 18, or other virtual boundary. The geofenced boundary 18 may be formed by one or more location aware communication devices so as to detect entries into or exits from the boundary 18 in conjunction with a position fix obtained via a suitable positioning technique. A geofence may comprise a virtual perimeter on a geographic area established in connection with a suitable location-based service, for example, such that if a tracked mobile electronic device 12A enters or exits the area a notification is generated. A signal may be generated and may comprise, for example, information about a time of crossing of the customer 11A at the geofence boundary 18. As with other method steps, the step at block 304 may be performed before, after, or contemporaneously with the step at block 302.

At block 306, the mobile application 33 executed at the customer's mobile electronic device 12A may identify a current location of the mobile electronic device 12A, and send the location information to the freshness tracking system 26 for subsequent use and processing.

At block 308, the location information is stored at the database 30, and can be retrieved by the system 26 and/or mobile electronic device 12A to show that the customer 11A is in the store, or otherwise inside the geofenced boundary 18.

At block 310, the freshness tracking system 26 can output thresholds or other settings to the customer's mobile electronic device 12A. For example, a time threshold may include a period of time, for example, 1 minute. If a sensor 22 determines that a store associate 13 is at a shelf 20 for more than 1 minute, a determination is made that the store associate is restocking the shelf 20 with a fresh perishable product.

At block 312, an application on the handheld electronic device 32 is updated to include the settings received from the freshness tracking system 26. In some embodiments. The settings 312 updated in the handheld device 32 are for an application stored at and executed by the associate mobile electronic device 32 that can make determinations based on the signals received from the sensors 22 e.g., beacons, as to whether restocking is occurring. The device 32 may receive threshold/setting updates on a predetermined basis, for example, configured to occur any time that the device 32 is in communication with the network 16.

Another feature of the handheld electronic device 32 is that it may store and execute applications that communicate with the sensors 22 for example, receiving beacon signals, and send data back to the system 26 when a restocking operation has occurred. The mobile application, on the other hand, is stored and executed on the customer mobile electronic device 12 includes a customer interface to handle the preference management, trigger notifications based on the GPS or Wifi capabilities in the device 12, and to receive and display the notifications.

At block 314, shelf stocking data is output from the tracking beacon 30 regarding products being tracked, for example, product or shelf location information which recognizes when fresh products are being restocked. In some embodiments, the tracking beacon 30 includes object recognition technology for identify the fresh perishable good 24. In other embodiments, the tracking beacon 30 and/or other sensors at the store shelf 20 detect the presence of a store associate 13 and/or movement of items 24 at the shelf 20. The tracking beacon 30 and/or other sensors may communicate with a scanning device or the like for establishing the stocking of the store shelf 20. Product information, timestamp, location data, and/or other relevant data may be output as part of or independently of the signal.

At block 316, the beacon signal generated by the tracking beacon 30 is detected by the handheld device application 32. A conversion device is present between the beacon device 30 and the handheld device to convert the beacon signal into data that is processed by the handheld device. For example, the beacon signal is indicative of a fresh perishable item 24 added to the store shelf 20.

At block 318, the handheld device application 32 measures a time delta, the time that it detects (316) the beacon signal until the time threshold received (312) is met or exceeded. Time detection is relevant in that it may relate to false positive stocking notifications. For example, if an associate 13 is in an area for only a short period of time, an assumption is made that the associate 13 is not stocking the shelf 20 but is instead walking past the shelf 20. If the associate 13 exceeds a time and/or location threshold, and still not stocking the shelf 20, then the system 26 may prevent a false positive event by executing a special-purpose program executed by a computer processor that is configured to prompt the associate's mobile electronic device 32 to confirm before sending restock data to the system 26.

At block 320, a current status of the product is updated. For example, the status may pertain to the freshness of the product. In another example, the system 26 may store in the database 30 a record that includes a time that the product was restocked. The status in this example may be a "restocked" status at a timestamp for the product.

At block 322, a notification is generated for customers tracking the fresh perishable 24 of interest. The freshness tracking system 26 first identifies those customers interested in the fresh perishable 24, for example, by accessing, customer data, or more specifically, notification preferences, from the database 30, or the freshness tracking system 26. At block 324, the mobile electronic device 12A receives and processes the notification, for example, displays the notification for viewing by the customer 11A.

At decision diamond 326, the customer 11 determines whether to purchase the stocked fresh perishable 324 in view of the notification, and either purchases (328) or doesn't purchase (330) the fresh perishable 324.

Figure 4:
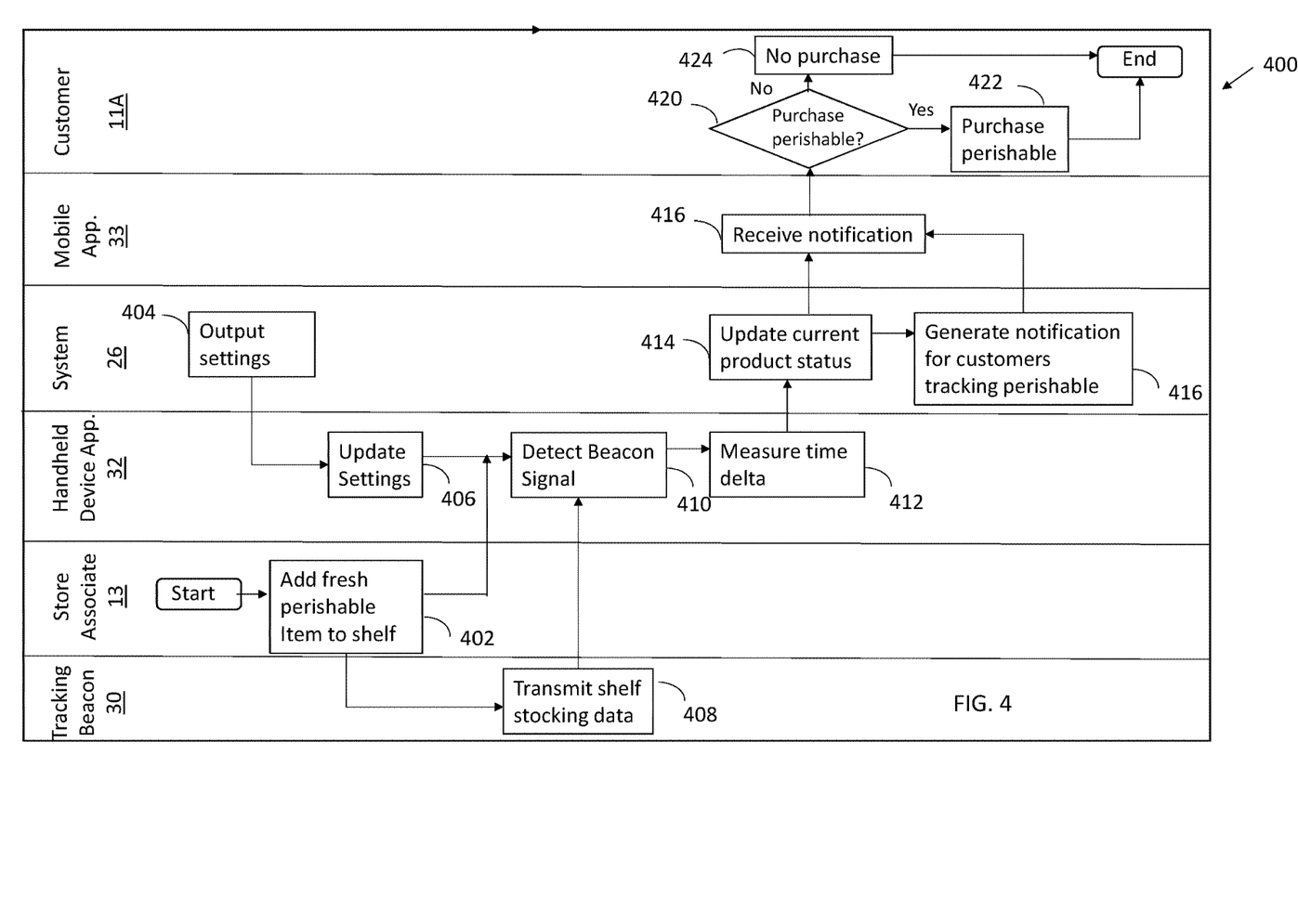
FIG. 4 is a process flow for store item notification, in accordance with some embodiments.

FIG. 4 is a process flow 400 for store item notification, in accordance with some embodiments. When describing the process flow 300, reference is made to various elements of the environment described with reference to FIG. 1. The process flow 400 described with reference to FIG. 4 may apply to a customer 11B who is not present at the store, and is therefore not detected by a geofence, Wifi network, or other location sensors at the store. Instead, the customer 11B may be interested in purchasing a perishable product from a remote location, for example, via an internet website, a phone call to the store, or other communication. In contrast, the process flow 300 uses data from the database 30 at block 308 as a determining factor as to whether we should generate a notification described at block 322. A shopper 11 may opt into the system 26, for example, and indicate whether the shopper 11 is at a store or remote from the store. If the shopper 11 indicates that the shopper 11 is at the store, then the process 300 may be performed; otherwise, process 400 may be performed.

At block 402, a customer associate 13 can add fresh perishables 24 to a store shelf 20. The customer associate 13 may include a scanning device or other mobile device for identifying the fresh perishable 24 added to the store shelf 20, which can produce a timestamp and/or other product information, which be processed by the freshness tracking system 26.

At block 404, the freshness tracking system 26 can output thresholds or other settings to the customer's mobile electronic device 12A, for example, described above.

At block 406, the handheld device application 32 is updated to include the settings received from the freshness tracking system 26, for example, described above.

At block 408, shelf stocking data is output from the tracking beacon 30 regarding products being tracked, for example, product or shelf location information which recognizes when fresh products are being restocked. In some embodiments, the tracking beacon 30 includes object recognition technology for identify the fresh perishable good 24. In other embodiments, the tracking beacon 30 and/or other sensors at the store shelf 20 detect the presence of a store associate 13 and/or movement of items 24 at the shelf 20. The tracking beacon 30 and/or other sensors may communicate with a scanning device or the like for establishing the stocking of the store shelf 20. Product information, timestamp, location data, and/or other relevant data may be output as part of or independently of the signal.

At block 410, a beacon signal is detected by the handheld device application 32. The beacon signal is indicative of fresh perishable goods 24 being added to the store shelf 20.

Blocks 412-424 are the same as or similar to blocks 318-330 of FIG. 3. Details thereof are not repeated for reasons related to brevity.

Figure 5:
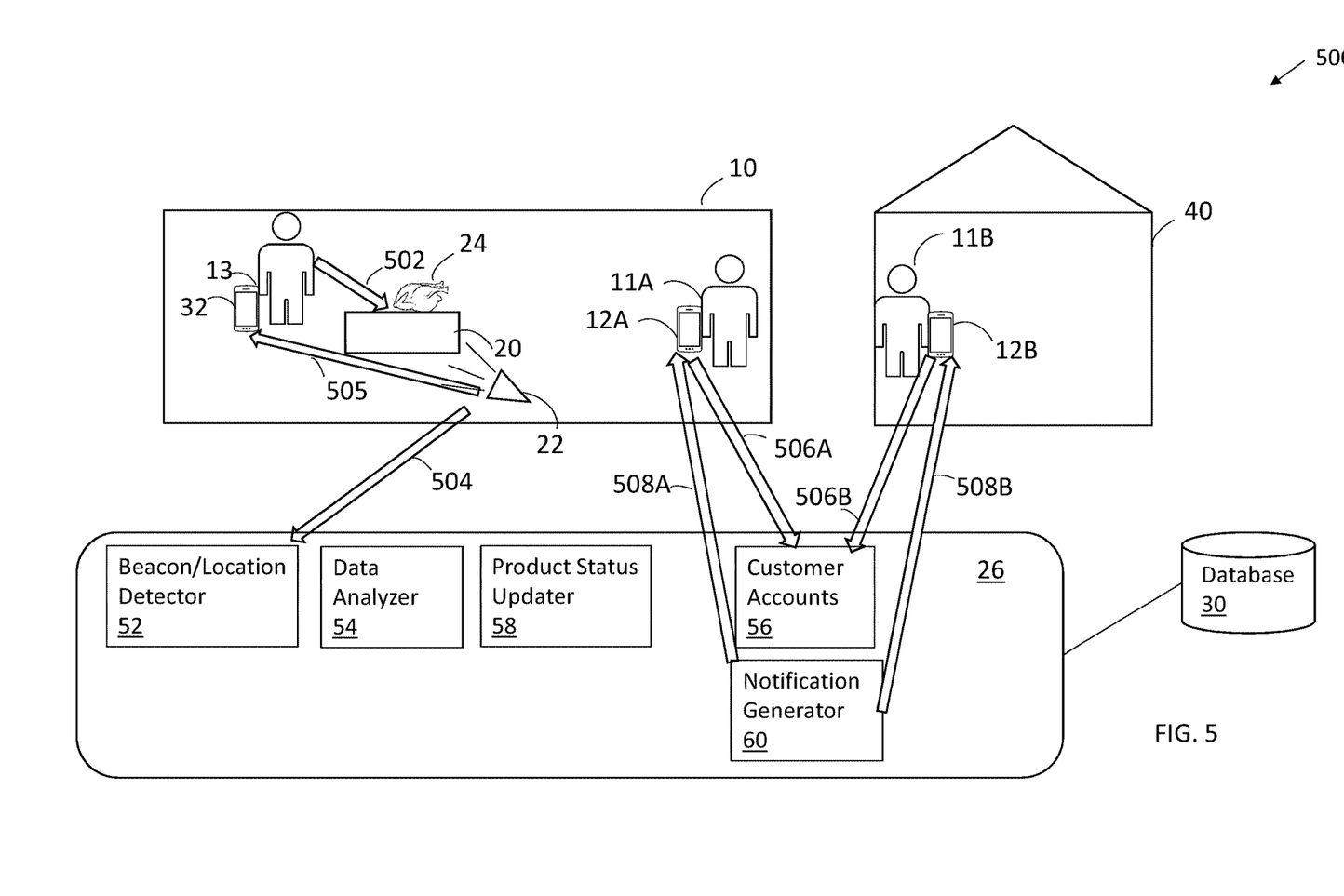
FIG. 5 is a schematic representation of an environment, including a block diagram and process flow, in which embodiments of the present inventive concepts can be practiced.

FIG. 5 is a schematic representation of an environment 500, including a block diagram and process flow, in which embodiments of the present inventive concepts can be practiced. In describing the environment 500 illustrated in FIG. 5, reference is made to elements of FIGS. 1-4.

A store associate 13 places (502) a fresh perishable item 24 on a store shelf 20. At least one beacon and/or related sensor 22 is positioned at or near the store shelf 20 for detecting a possible restocking event. In doing so, a timestamp or related information is generated.

In some embodiments, the freshness tracking system 26 includes a detector 52, data analyzer 54, customer account repository 56, product status updater 58, and notification generator 60. In some embodiments, one or more beacons 22 or the like may be part of the system 26.

The detector 52 may include a beacon detector and/or a location detector. Accordingly, the detector 52 receives (504) beacon information, which can be used by the data analyzer to determine according to pre-established rules that a restocking event has occurred. For example, the data analyzer may determine from the timestamp that the store associate 13 is in a perimeter of beacon detection for a period of time that exceeds a time and/or location threshold. The data analyzer 54 can generate a result concluding that a restocking event has indeed occurred.

Also, each customer 11A, 11B (generally, 11) may provide (506A, 506B, respectively (generally 506)) a set of notification preferences, which is stored at the customer account repository 56. The customer account repository 56 may be part of the freshness tracking system 26 or the database 30 in communication with the freshness tracking system 26. Customer 11A may be at the store 10 and may be subject to location tracking using a geofence or the like, for example, described in FIG. 3. Customer 11A may be at a different location, such as a home 40 and is not subject to location tracking.

The product status updater 58 updates the system 26 with information about the added fresh perishable products 24 by using an inventory tracking device, for example, which may be part of the customer electronic device application 33 and/or store associate handheld device application 32, which may capture a signal (505) from a beacon or related sensor output and make determinations based on settings uploaded to the device by the system 26 to determine if a restocking event has occurred, and outputs a determination result to the system 26. The customer using a computing device may also interface with an inventory management system in real-time, or near real-time as part of a process using the system to be instantly notified of the freshest products available.

Each customer 11A, 11B (generally, 11) may receive (508A, 508B), respectively (generally 508)) a notification according to their unique customer preferences.

As will be appreciated by one skilled in the art, aspects of the inventive concepts may be embodied as a system, method, or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

While the invention has been shown and described with reference to specific preferred embodiments, it should be understood by those skilled in the art that various changes in form and detail may be made therein without departing from the spirit and scope of the invention as defined by the following claims.

The foregoing and other features and advantages of the invention will be apparent to those of ordinary skill in the art from the following more particular description of the invention and the accompanying drawings.

The foregoing and other features and advantages of the invention will be apparent to those of ordinary skill in the art from the following more particular description of the invention and the accompanying drawings.

What is claimed is:

1. A system for providing a shopper with product freshness notifications, comprising:
    a beacon that determines that a fresh perishable product of interest has been added to a store shelf as part of a restocking event;
    a product status updater that updates the system with information about the fresh perishable product added to the store shelf including a received timestamp that includes a time of the restocking event, the timestamp generated in response to the system identifying the item of interest; and
    a notification generator that outputs a notification to a mobile electronic device of the shopper tracking the fresh perishable product of interest regarding the addition of the fresh perishable product to the store shelf.

2. The system of claim 1, further comprising a location detector that detects the shopper inside the store by communication with a geo-fencing, global positioning (GPS), or Wifi system.

3. The system of claim 2, wherein the notification generator outputs the notification in response to the location detector detecting the shopper inside the store.

4. The system of claim 1, wherein the system determines that the fresh perishable item is added to the store shelf in response to the location detector determining that the shopper is remote from the store.

5. The system of claim 1, wherein the product status updater updates a database with the information about the added fresh perishable items by using an inventory tracking device to scan a product barcode corresponding to the fresh perishable items added to the shelf to update a status of the item in the system.

6. The system of claim 1, wherein the beacon automatically detects the stocking of the store shelf with the fresh perishable items.

7. The system of claim 6, the system determines that the customer is at the store and a determination is made that the fresh perishable item is added to the store shelf in response to a location detector detecting that the shopper is at the store.

8. A method for providing a shopper with product freshness notifications, comprising:
    determining, by a beacon, that a fresh perishable item of interest has been added to a store shelf as part of a restocking event;
    updating a freshness tracking system with information about the fresh perishable item added to the store shelf including a received timestamp that includes a time of the restocking event, the timestamp generated in response to identifying the item of interest; and
    sending a notification from the freshness tracking system to a mobile electronic device of the shopper tracking the fresh perishable product of interest regarding the addition of the fresh perishable item to the store shelf.

9. The method of claim 8, wherein the notifications are sent in response to a customer location detected using geo-fencing, global positioning (GPS), or Wifi when the shopper is inside the store.

10. The method of claim 8, wherein the freshness tracking system is updated with the information about the added fresh perishable items by using an inventory tracking device to scan a product barcode corresponding to the fresh perishable items added to the shelf to update a status of the item in the system.

11. The method of claim 8, wherein the beacon automatically detects the stocking of the store shelf with the fresh perishable items.

12. The method of claim 8, wherein when the shopper is determined to be remote from the store, a determination is made that the fresh perishable item is added to the store shelf.

13. The method of claim 8, wherein when the shopper is determined to be at the store, a determination is made that the customer is at the store and a determination is made that the fresh perishable item is added to the store shelf.

14. The method of claim 8, wherein the beacon provides data that a store associate is at the store shelf where the fresh perishable item is supposed to be located, and that a determination is made that the store associate is stocking the shelf with the fresh perishable item.

15. The method of claim 8, further comprising processing a threshold that establishes whether the store shelf is restocked with the fresh perishable item based on an amount of time of a store associate at the store shelf compared to the threshold.

16. The method of claim 8, wherein the beacon identifies the fresh perishable item added to the store shelf.

17. The method of claim 8 further comprising:
opting in, by a shopper, and identifying whether the shopper is at a store or remote from the store; and
requesting by the shopper to receive an item freshness status notification of the notification regarding the fresh perishable item.

18. A computer program product for online appointment scheduling, the computer program product comprising:
a computer readable storage medium having computer readable program code embodied therewith, the computer readable program code comprising:
computer readable program code configured to determine that a fresh perishable item of interest has been added to a store shelf as part of a restocking event;
computer readable program code configured to update a freshness tracking system with information about the fresh perishable item added to the store shelf including a received timestamp that includes a time of the restocking event, the timestamp generated in response to identifying the item of interest; and
computer readable program code configured to send a notification from the freshness tracking system to a mobile electronic device of the shopper tracking the fresh perishable product of interest regarding the addition of the fresh perishable item to the store shelf.

19. The system of claim 1, further comprising a data analyzer that determines from the timestamp that the restocking event has occurred.

20. The method of claim 8, further determining by a data analyzer from the timestamp that the restocking event has occurred.

* * * * *